United States Patent
Chauvel et al.

(10) Patent No.: US 7,162,586 B2
(45) Date of Patent: Jan. 9, 2007

(54) SYNCHRONIZING STACK STORAGE

(75) Inventors: Gerard Chauvel, Antibes (FR); Serge Lasserre, Plascassier (FR)

(73) Assignee: Texas Instruments Incorporated, Dallas, TX (US)

( * ) Notice: Subject to any disclaimer, the term of this patent is extended or adjusted under 35 U.S.C. 154(b) by 239 days.

(21) Appl. No.: 10/631,422

(22) Filed: Jul. 31, 2003

(65) Prior Publication Data
US 2004/0078531 A1    Apr. 22, 2004

Related U.S. Application Data

(60) Provisional application No. 60/400,391, filed on Jul. 31, 2002.

(30) Foreign Application Priority Data
Jul. 30, 2003  (EP) ................... 03291912

(51) Int. Cl.
G06F 12/08    (2006.01)
(52) U.S. Cl. .................................. 711/132
(58) Field of Classification Search ............... 711/132, 711/133, 135, 144
See application file for complete search history.

(56) References Cited

U.S. PATENT DOCUMENTS

| | | | |
|---|---|---|---|
| 5,107,457 A * | 4/1992 | Hayes et al. ................. | 711/132 |
| 5,953,741 A * | 9/1999 | Evoy et al. .................. | 711/132 |
| 5,970,242 A * | 10/1999 | O'Connor et al. .......... | 717/100 |
| 6,092,152 A * | 7/2000 | Tremblay et al. ........... | 711/132 |
| 6,098,089 A | 8/2000 | O'Connor et al. .......... | 709/104 |
| 6,219,757 B1 * | 4/2001 | Vishin ......................... | 711/135 |
| 6,367,005 B1 * | 4/2002 | Zahir et al. .................. | 712/228 |
| 6,567,905 B1 | 5/2003 | Otis ............................. | 711/170 |
| 6,571,260 B1 | 5/2003 | Morris ....................... | 707/206 |
| 6,604,190 B1 * | 8/2003 | Tran ............................ | 712/207 |
| 6,868,482 B1 * | 3/2005 | Mackenthun et al. ....... | 711/120 |
| 2002/0065990 A1 | 5/2002 | Chauvel et al. ............. | 711/137 |
| 2002/0069332 A1 | 6/2002 | Chauvel et al. ............. | 711/144 |
| 2003/0101320 A1 | 5/2003 | Chauvel et al. ............. | 711/154 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

* cited by examiner

*Primary Examiner*—Hiep T. Nguyen
(74) *Attorney, Agent, or Firm*—Ronald O. Neerings; W. James Brady, III; Frederick J. Telecky, Jr.

(57) ABSTRACT

A system comprises a main stack, a local data stack and plurality of flags. The main stack comprises a plurality of entries and is located outside a processor's core. The local data stack is coupled to the main stack and is located internal to the processor's core. The local data stack has a plurality of entries that correspond to entries in the main stack. Each flag is associated with a corresponding entry in the local data stack and indicates whether the data in the corresponding local data stack entry is valid. The system performs two instructions. One instruction synchronizes the main stack to the local data stack and invalidates the local data stack, while the other instruction synchronizes the main stack without invalidating the local data stack.

13 Claims, 4 Drawing Sheets

FIG. 3

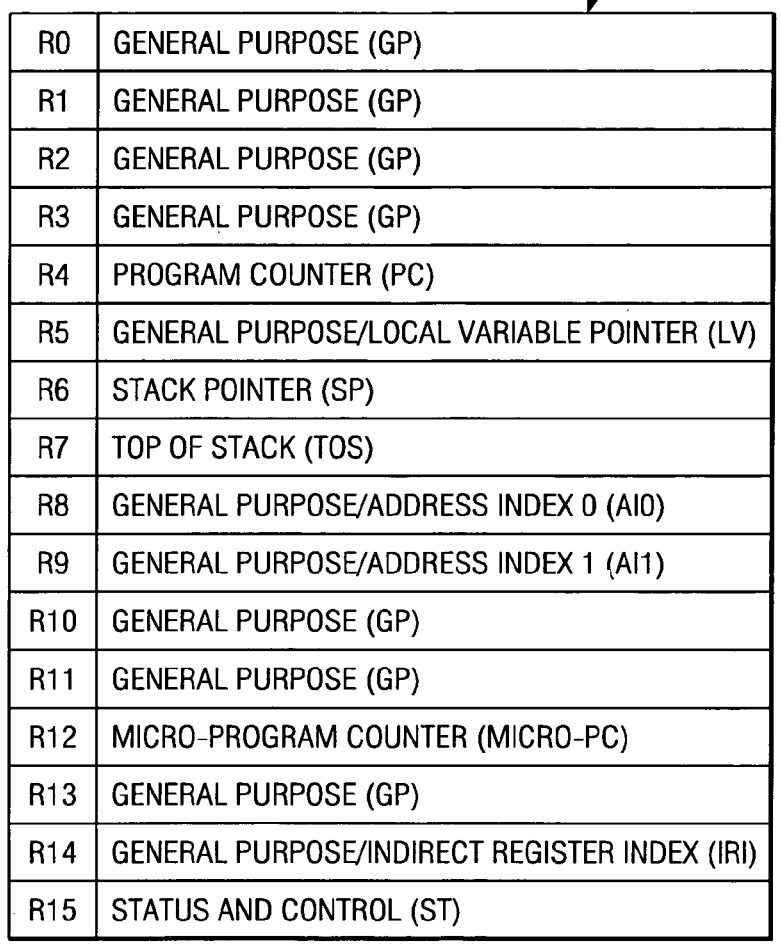

| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (TOS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE/INDIRECT REGISTER INDEX (IRI) |
| R15 | STATUS AND CONTROL (ST) |

FIG. 4A

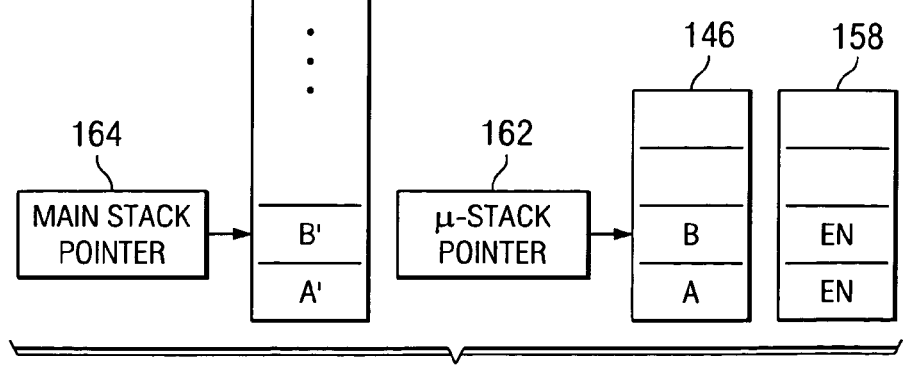

SYNCHRONIZING STACK STORAGE

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291912.8, filed Jul. 30, 2003 and entitled "Synchronizing Stack Storage," incorporated herein by reference. This application also may contain subject matter that may relate to the following commonly assigned co-pending applications incorporated herein by reference: "System And Method To Automatically Stack And Unstack Java Local Variables," Ser. No. 10/632,228 filed Jul. 31, 2003, "Memory Management Of Local Variables," Ser. No. 10/632,067, filed Jul. 31, 2003, "Memory Management Of Local Variables Upon A Change Of Context," Ser. No. 10/632,076, filed Jul. 31, 2003, "A Processor With A Split Stack," Ser. No. 10/632,079, filed Jul. 31, 2003, "Using IMPDEP2 For System Commands Related. To Java Accelerator Hardware," Ser. No. 10/632,069, filed Jul. 31, 2003, "Test With Immediate And Skip Processor Instruction," Ser. No. 10/632,214, filed Jul. 31, 2003, "Test And Skip Processor Instruction Having At Least One Register Operand," Ser. No. 10/632,084, filed Jul. 31, 2003, "Methods And Apparatuses For Managing Memory," Ser. No. 10/631,252, filed Jul. 31, 2003, "Write Back Policy For Memory," Ser. No. 10/631,185, filed Jul. 31, 2003, "Methods And Apparatuses For Managing Memory," Ser. No. 10/631,205, filed Jul. 31, 2003, "Mixed Stack-Based RISC Processor," Ser. No. 10/631,308, filed Jul. 31, 2003, "Processor That Accommodates Multiple Instruction Sets And Multiple Decode Modes," Ser. No. 10/631,246, filed Jul. 31, 2003, "System To Dispatch Several Instructions On Available Hardware Resources," Ser. No. 10/631,585, filed Jul. 31, 2003, "Micro-Sequence Execution In A Processor," Ser. No. 10/632,216, filed Jul. 31, 2003, "Program Counter Adjustment Based On The Detection Of An Instruction Prefix," Ser. No. 10/632,222, filed Jul. 31, 2003, "Reformat Logic To Translate Between A Virtual Address And A Compressed Physical Address," Ser. No. 10/632,215, filed Jul. 31, 2003, "Synchronization Of Processor States," Ser. No. 10/632,024, filed Jul. 31, 2003, "Conditional Garbage Based On Monitoring To Improve Real Time Performance," Ser. No. 10/631,195, filed Jul. 31, 2003, "Inter-Processor Control," Ser. No. 10/631,120, filed Jul. 31, 2003, "Cache Coherency In A Multi-Processor System," Ser. No. 10/631,229, filed Jul. 31, 2003, "Concurrent Task Execution In A Multi-Processor, Single Operating System Environment," Ser. No. 10/632,077, filed Jul. 31, 2003, and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to synchronizing stack storage that may be located external to a processor's core to stack storage that may be located internal to a processor's core.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In at least one embodiment, a system comprises a main stack, a local data stack and plurality of flags. The main stack preferably comprises a plurality of entries and is located outside a processor's core. The local data stack is coupled to the main stack and preferably is located internal to the processor's core. The local data stack has a plurality of entries that correspond to entries in the main stack. Each flag is associated with a corresponding entry in the local data stack and indicates whether the data in the corresponding local data stack entry is valid. The system preferably performs two instructions. One of the instructions copies all valid data from the local data stack in the processor's core to corresponding entries in the main stack outside the processor's core and invalidates all previously valid local data stack entries. The other instruction copies all valid data from the local data stack to the main stack, but does not invalidate the local data stack. Other embodiments comprise related methods.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The term "system" is used to refer to a collection of components. For example, a system may comprise a processor and memory and other components. A system also may comprise a collection of components internal to a single processor and, as such, a processor may be referred to as a system.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIGS. 4A–C depict stack management in the event of an overflow condition;

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein is particularly suited for executing Java™ bytecodes or comparable, code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow. The processor described herein may be used in a wide variety of electronic systems. By way of example and without limitation, the Java-executing processor described herein may be used in a portable, battery-operated cell phone. Further, the processor advantageously includes one or more features that reduce the amount of power consumed by the Java-executing processor.

Figure 1:
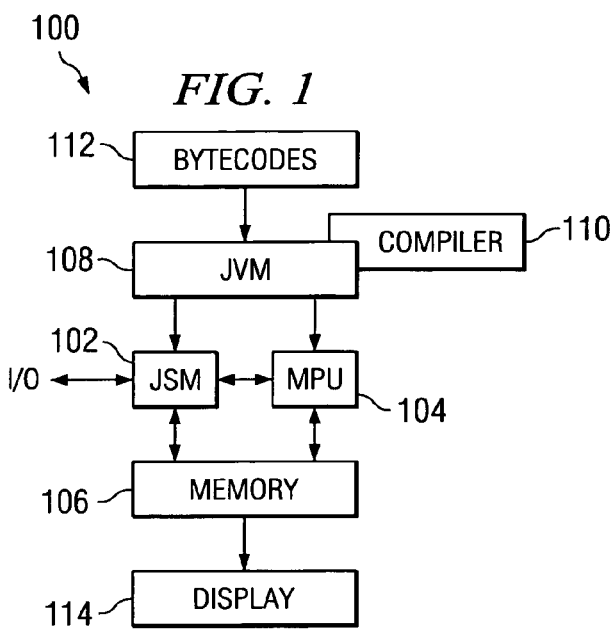
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include an external memory 106 coupled to both the JSM 102 and MPU 104 and thus accessible by both processors. The external memory 106 may exist on a separate chip than the JSM 102 and the MPU 104. At least a portion of the external memory 106 may be shared by both processors meaning that both processors may access the same shared memory locations. Further, if desired, a portion of the external memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As noted above, while system 100 may be representative of, or adapted to, a wide variety of electronic systems, an exemplary electronic system may comprise a battery-operated, mobile cell phone.

As is generally well known, Java code comprises a plurality of "bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. In accordance with preferred embodiments of the invention, the JSM 102 may execute at least two instruction sets. One instruction set may comprise standard Java bytecodes. As is well-known, Java bytecode is a stack-based intermediate language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code, where the stack may include multiple portions that exist in different physical locations.

Another instruction set executed by the JSM 102 may include instructions other than standard Java instructions. In accordance with at least some embodiments of the invention, other instruction sets may include register-based and memory-based operations to be performed. This other instruction set generally complements the Java instruction set and, accordingly, may be referred to as a complementary instruction set architecture ("C-ISA"). By complementary, it is meant that the execution of more complex Java bytecodes may be substituted by a "micro-sequence" comprising one or more C-ISA instructions that permit address calculation to readily "walk through" the JVM data structures. A microsequence also may include one or more bytecode instructions. The execution of Java may be made more efficient and run faster by replacing some sequences of bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based C-ISA instructions. Both architectures preferably are tightly combined and integrated through the C-ISA.

Figure 2:
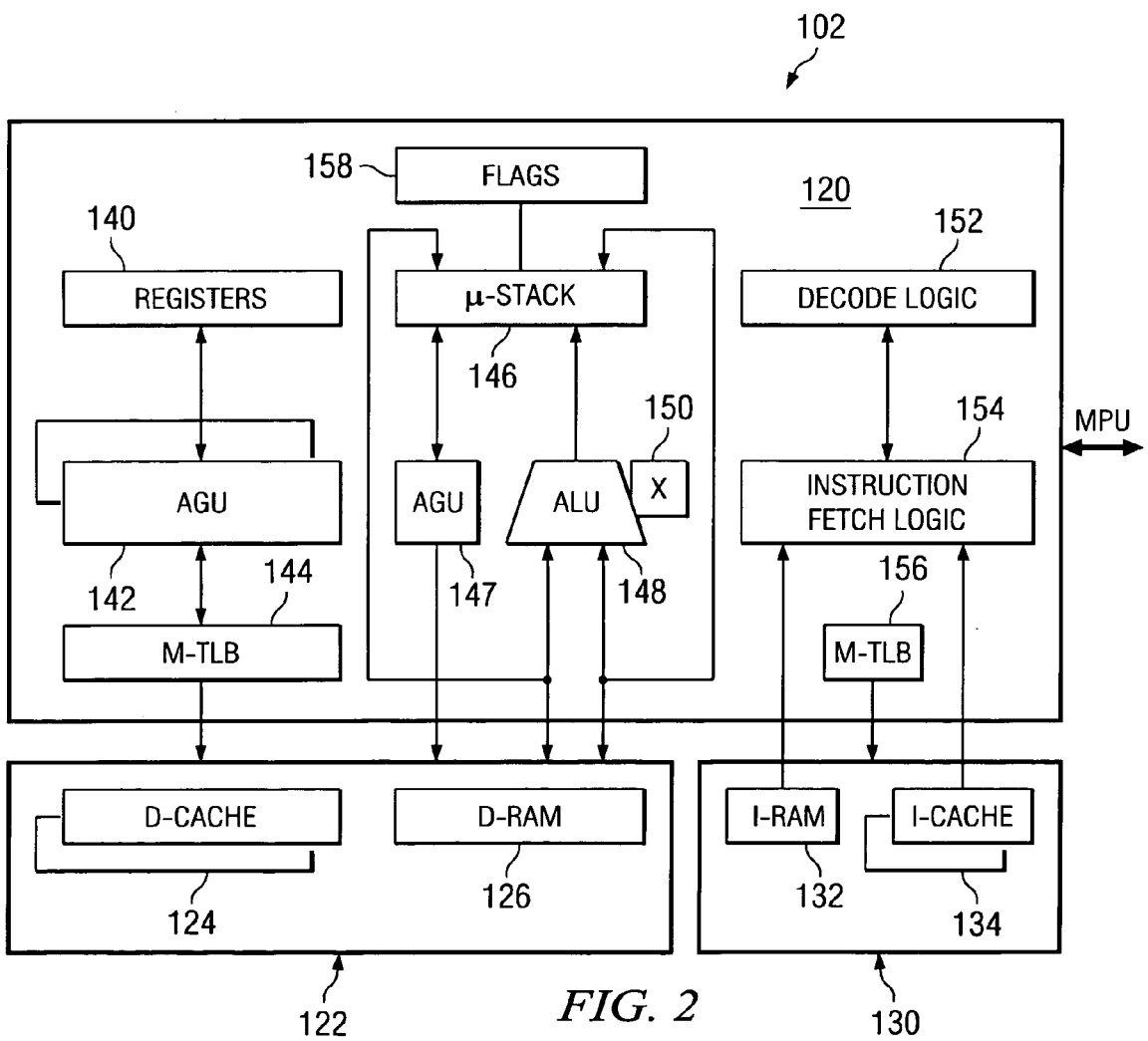
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to a data storage 122 and an instruction storage 130. Storage 122 and 130 are preferably integrated, along with core 120, on the same JSM chip. Integrating storage 122 and 130 on the same chip as the core 120 may reduce data transfer time from storage 122 and 130 to the core 120. The core 120 may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from a main stack and processed by the ALU 148, where the main stack may include multiple portions that exist in different physical locations. For example, the main stack may reside in external memory 106 and/or data storage 122. Selected entries from the main stack may exist on the micro-stack 146. In this manner, selected entries on the micro-stack 146 may represent the most current version of the operands in the system 100. Accordingly, operands in external memory 106 and data storage 122 may not be coherent with the versions contained on the micro-stack 146. A plurality of flags 158 are associated with the micro-stack 146. Each micro-stack entry preferably has an associated flag 158. Each flag 158 indicates whether the data in the associated micro-stack entry is valid and whether the data has been modified. Also, stack coherency operations may be performed by examining the flags 158 and updating the main stack with valid operands from the micro-stack 146 as will be explained below.

The micro-stack 146 preferably comprises, at most, the top n entries of the main stack that is implemented in data storage 122 and/or external memory 106. The micro-stack 146 preferably comprises a plurality of gates in the core 120 of the JSM 102. By implementing the micro-stack 146 in gates (e.g., registers) in the core 120 of the JSM 102, access to the data contained on the micro-stack 146 is generally quite fast. Therefore, data access time may be reduced by providing data from the micro-stack 146 instead of the main stack. General stack requests are provided by the micro-stack 146 unless the micro-stack 146 cannot fulfill the stack requests. For example, when the micro-stack 146 is in an overflow condition or when the micro-stack 146 is in an underflow condition (as will be described below), general stack requests may be fulfilled by the main stack. By analyzing trends of the main stack, the value of n, which represents the size of the micro-stack 146, may be optimized such that a majority of general stack requests are fulfilled by the micro-stack 146, and therefore may provide requested data in fewer cycles. As a result, power consumption of the system 102 may be reduced. Although the value of n may vary in different embodiments, in accordance with at least some embodiments, the value of n may be the top eight entries in the main stack. In this manner, about 98% of the general stack accesses may be provided by the micro-stack 146, and the number of accesses to the main stack may be reduced. As will be seen below, the main stack may not always be coherent with the micro-stack and, there may be a need, at times, to synchronize the main stack to the micro-stack.

Instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions. The AGUs 142 may support parallel data accesses for C-ISA instructions that perform array or other types of processing. AGU 147 couples to the micro-stack 146 and may manage overflow and underflow conditions on the micro-stack 146 preferably in parallel. The micro-TLBs 144, 156 generally perform the function of a cache for the address translation and memory protection information bits that are preferably under the control of the operating system running on the MPU 104.

Referring now to FIG. 3, the registers 140 may include 16 registers designated as R0–R15. Registers R0–R3, R5, R8–R11 and R13–R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is reflected in registers R6 and R7. The top of the micro-stack 146 has a matching address in external memory 106 pointed to by register R6. The operands contained on the micro-stack 146 are the latest updated values, while their corresponding values in external memory 106 may or may not be up to date. Register R7 provides the data value stored at the top of the micro-stack 146. Registers R8 and R9 may also be used to hold an address index 0 ("AI0") and an address index 1 ("AI1"), which may be used in calculating addresses in memory generated by various bytecodes, for example, the result of an IADD instruction. Register R14 may also be used to hold the indirect register index ("IRI") that also may be used in calculating memory addresses. Register R15 may be used for status and control of the JSM 102. As an example, one status/control bit (called the "Micro-Sequence-Active" bit) may indicate if the JSM 102 is executing a "simple" instruction or a "complex" instruction through a micro-sequence as explained above. This bit controls in particular, which program counter is used R4 (PC) or R12 (micro-PC) to fetch the next instruction. A "simple" bytecode instruction is generally one in which the JSM 102 may perform an immediate operation either in a single cycle (e.g., an IADD instruction) or in several cycles (e.g., "dup2_x2"). A "complex" bytecode instruction is one in which several memory accesses may be required to be made within the JVM data structure for various verifications (e.g., NULL pointer, array boundaries). Because these data structures are generally JVM-dependent and thus may change from one JVM implementation to another, the software flexibility of the micro-sequence provides a mechanism for various JVM optimizations now known or later developed.

Referring again to FIG. 2, the ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("D-RAM") 126. Reference may be made to copending applications U.S. Ser. No. 09/591,537 filed Jun. 9, 2000, Ser. No. 09/591,656 filed Jun. 9, 2000, and Ser. No. 09/932,794 filed Aug. 17, 2001, all of which are incorporated herein by reference. The main stack, arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced bytecodes or micro-sequences or predetermined sequences of code, as will be described below. The I-cache 134 may be used to store other types of Java bytecode and mixed Java/C-ISA instructions.

As noted above, the C-ISA instructions generally complement the standard Java bytecodes. For example, the compiler 110 may scan a series of Java bytes codes 112 and replace one or more of such bytecodes with an optimized code segment mixing C-ISA and bytecodes and which is capable of more efficiently performing the function(s) performed by the initial group of Java bytecodes. In at least this way, Java execution may be accelerated by the JSM 102.

As explained above, the JSM 102 implements a split stack architecture. As illustrated in FIGS. 4A–C and 5A–C below, the main stack (that may be implemented in data storage 122 and/or external memory 106) may be "incoherent" from the data contained in micro-stack 146. By way of background to FIGS. 4A–C and 5A–C, each micro-stack entry has a corresponding flag 158. The flag 158 indicates whether or not the corresponding micro-stack entry contains valid data. In the examples of FIGS. 4A–C and 5A–C, a flag 158 designated as "EN" signifies that the flag is enabled indicating that the corresponding micro-stack entry contains valid data. A flag that is blank indicates that the corresponding micro-stack entry does not contain valid data (i.e., contains invalid data).

Figure 4B:
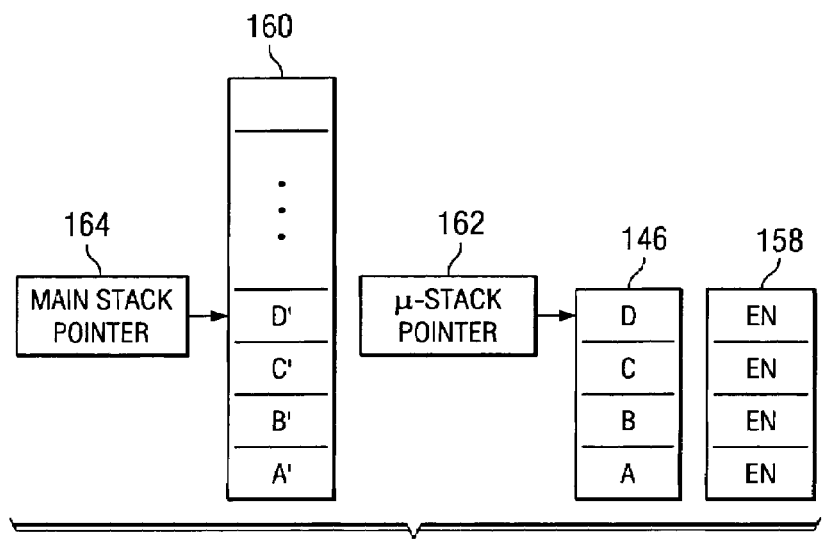
Figure 4C:
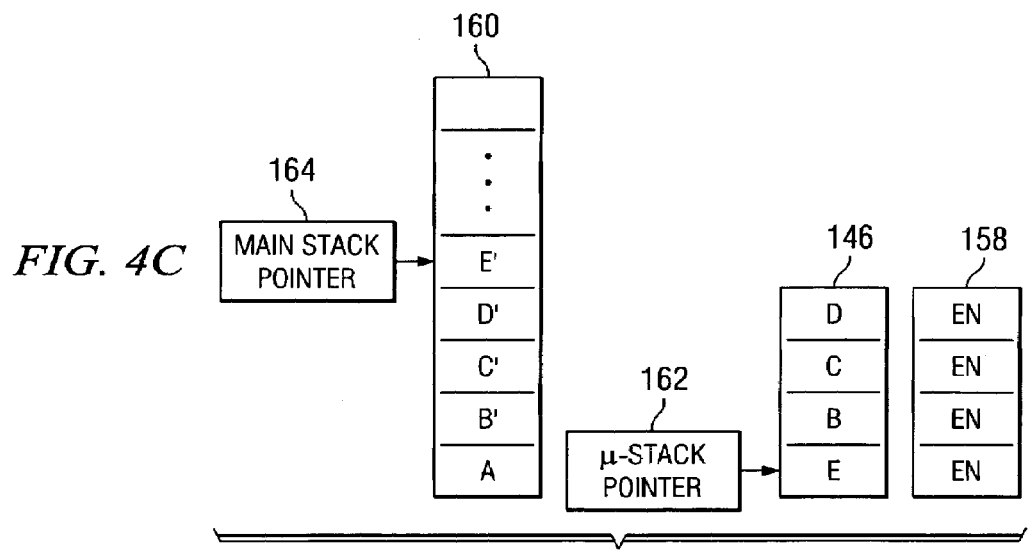

As noted above, the micro-stack 146 includes a finite number of entries, and therefore overflow and underflow conditions may occur. FIGS. 4A–C depict an overflow condition of the micro-stack 146. Note that although the micro-stack 146 shown in FIGS. 4A–C is shown containing four entries, preferred embodiments may have any number of entries. As shown in FIG. 4A, the micro-stack 146 may include data values or operands A and B, for example as the result of pushing A and B on the micro-stack 146. Stack pointers 162 and 164 reflect the top of the micro-stack 146 and the top of the main stack 160, respectively. When new data values are pushed on the micro-stack 146, the flags 158 may be enabled ("EN") to indicate that the new data is valid. Operands pushed on the micro-stack 146 generally are not pushed on a main stack 160. Operands A' and B' indicate the place of the data in the main stack, but these entries are not coherent with the corresponding micro-stack entries A and B. The symbol (') indicates that the associated operand is not actually present in the main stack. Coherence may be achieved if A and B are written to main memory during an overflow condition or flushing, as explained below. The main stack pointer 164 is updated at every push or pop. As indicated above, the main stack 160 may exist in external memory 106 and/or data storage 122, and the main stack 160 may be larger than the micro-stack 146.

FIG. 4B shows operands C and D pushed on the micro-stack 146, where the micro-stack 146 is now full. Any subsequent operand is pushed on the micro-stack 146 in a cyclical manner such that when the micro-stack 146 is full, the data at the bottom of the micro-stack 146 (which in this example is operand A) is overwritten. As operands are pushed into entries of the micro-stack 146, the flag 158 associated with each entry may be checked for validity. If the flag 158 indicates that the data in an entry, where a new push is performed, is valid (i.e., flag 158 enabled), then the entry is copied on to the main stack 160 prior to pushing the next data operand on the micro-stack 146. FIG. 4C depicts the result of pushing operand E on the full micro-stack 146 from FIG. 4B. When the micro-stack 146 is full (FIG. 4B), the bottom of the micro-stack 146 (operand A) is moved into the main stack 160 at an address value equal to the main stack pointer 164 minus the number of entries n comprising the micro-stack 146. For example, FIG. 4B shows the micro-stack 146 including 4 entries and the main stack pointer 164 indicating the top of the main stack 160. In this example, prior to overwriting operand A on the micro-stack 146 with operand E, operand A is copied to an address that is four entries less than the address indicated by the stack pointer 164. Thus, operand A from the micro-stack 164 is written to the main stack as indicated in FIG. 4C. then, operand E can be written to the micro-stack 146 as shown.

Figure 5A:
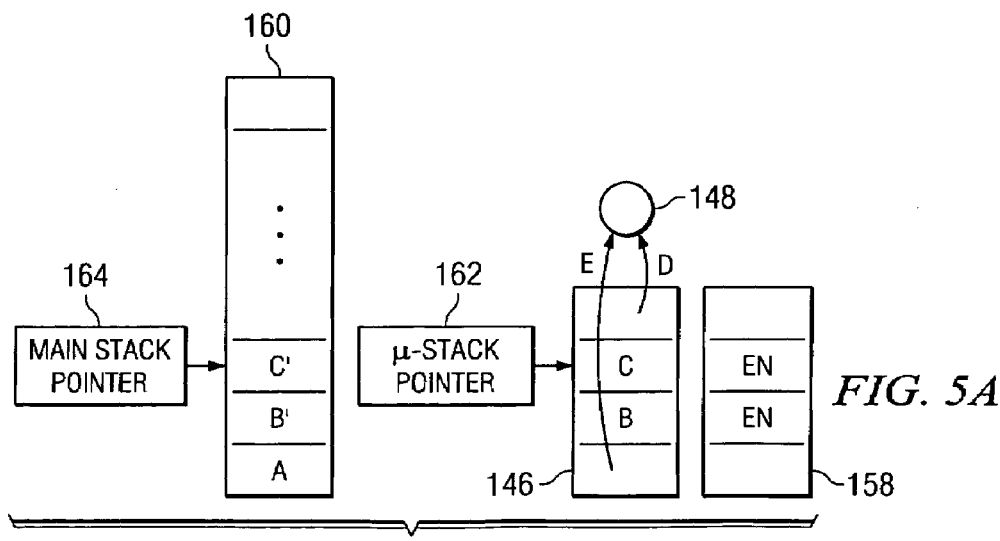
FIGS. 5A–C depict stack management in the event of an underflow condition.
Figure 5B:
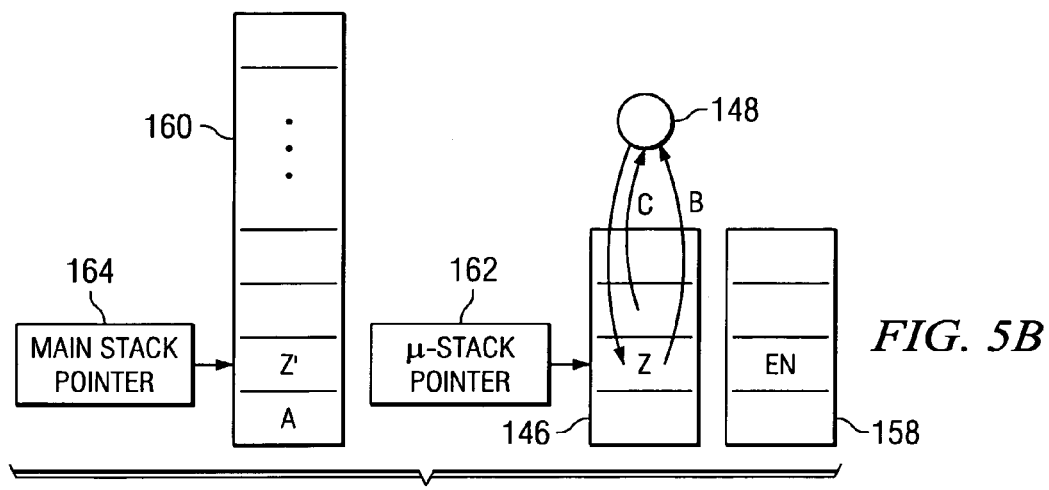
Figure 5C:
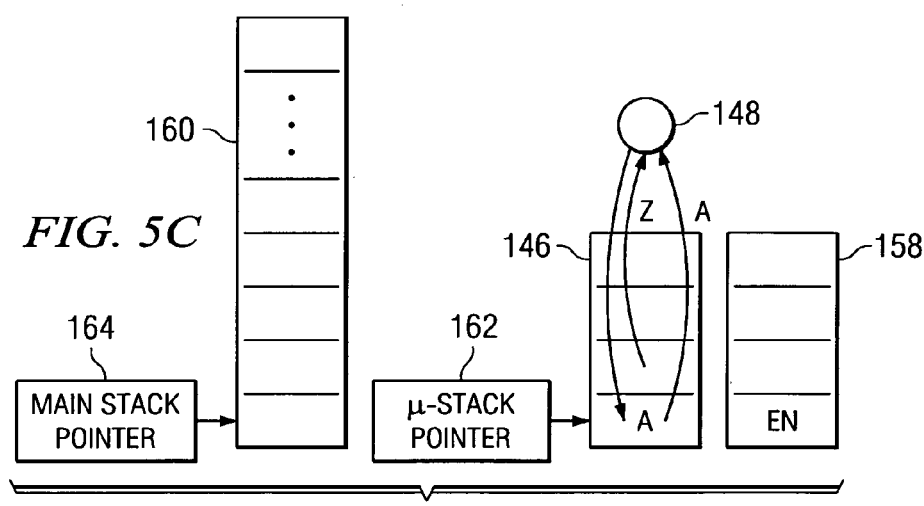

FIGS. 5A–C depict an underflow condition of the micro-stack 146 shown in FIG. 4C. Referring to FIG. 5A, operand E is popped off the micro-stack 146 and then operand D is popped off the micro-stack 146. As operands are popped off of the micro-stack 146 the corresponding flag 158 is invalidated and the stack pointers 162 and 164 are decremented. FIG. 5B illustrates a bytecode that provides operands B and C to the ALU 148. The ALU 148 produces a result Z, which is placed back on the micro-stack 146, and the flag 158 is enabled as shown. If a subsequent bytecode requires operand Z as well as another operand that is not on the micro-stack 146, an underflow occurs. Flag 158 preferably is checked for valid data prior to executing bytecodes to determine whether the required data is present on the micro-stack 146. For example, FIG. 5C depicts a bytecode requiring operand Z in addition to operand A, which is not on the micro-stack 146. Since flag 158 associated with operand A is not enabled in FIG. 5B, operand A is fetched from the main stack 160. In some embodiments, multiple operands may be fetched simultaneously from the main stack 160. In addition, other embodiments include prefetching the operands from the main stack 160.

Flags 158 may be implemented as one or more registers with bits allocated for each entry in the micro-stack 146, or alternatively flags 158 may include a read pointer and a write pointer. The read pointer is preferably updated on each stack instruction execution. For example, during an IADD instruction, the read pointer may decrement itself once for each operand that is popped off the stack, and then increment itself once to write the result of the operand back on the stack. The write pointer is preferably updated during an underflow or an overflow. By comparing the values of the read pointer and the write pointer, overflow and underflow conditions can be detected.

As illustrated in FIGS. 4A–C and 5A–C, the data in the main stack 160 may not be coherent with data in the micro-stack. For example, in FIG. 4C, the micro-stack contains operands B, C, and D that are not present in the main stack. Similarly, the main stack 160 contains operand E that is not present in the micro-stack. Situations may occur in which it is desirable to have the main stack 160 contain a complete view of all of the data in the main and micro-stacks and thus be made coherent with the micro-stack. For example, it may be desirable or required to change the current context of the system and doing so may require all stack data to be saved to external storage. Performing this action may require all of the stack data to be contained in the main stack to facilitate copying to external storage. The preferred embodiments of the invention permit the JSM 102 to execute a "clean and invalidate" instruction to make the main stack coherent with the micro-stack and invalidate the contents of the micro-stack so that, for instance, another thread may use the entire micro-stack. In other situations, there may be a need for the execution of some bytecodes to access and test a value embedded in the stack, but not at the top, before performing additional processing. The additional processing may depend on the outcome of testing the embedded stack value. This situation may require the main stack to have a complete view of all stack data, but it may be desirable for the micro-stack to retain all of its current data. Accordingly, the JSM 102 also may execute a "clean" instruction which makes the main stack coherent with the micro-stack, but does not invalidate the data in the micro-stack so that any valid micro-stack data can be readily used as desired. The execution of the "clean and invalidate" and "clean" instructions will be described below.

Figure 6:
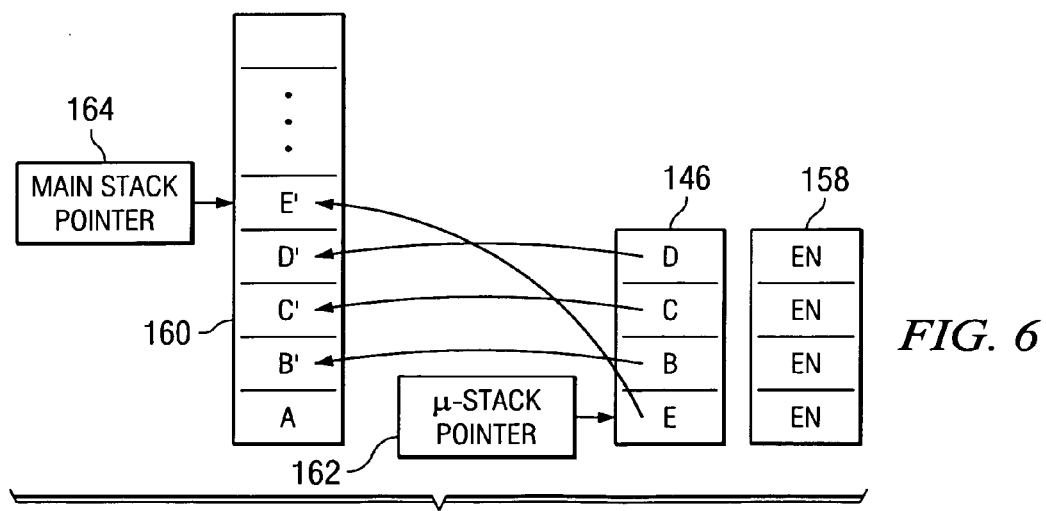
FIG. 6 depicts the operation of an instruction that cleans and invalidates a local data stack contained in the JSM.

FIG. 6 illustrates the operation of the clean and invalidate instruction. The state of the micro-stack 146 and the main stack 160 in FIG. 6 is repeated from that of FIG. 4C. As such, the micro-stack 146 is full with valid data for operands B–E and the main stack has valid data for operand A and placeholders for operands B–E. Thus, micro-stack 146 has valid data that is not present in the main stack 160. The clean and invalidate instruction preferably scrolls through some or all of the micro-stack 146, beginning with the top of the micro-stack that is identified by micro-stack pointer 162, and copies all valid data to corresponding entries in the main stack 160 and clears the corresponding valid bits (flags 158) in the micro-stack. In general, however, the order in which the micro-stack entries are examined for valid data to be copied to the main stack is not important and thus the entries can be examined in any order.

Referring to the example of FIG. 6, the clean and invalidate instruction causes the JSM 102 to begin with the top of the micro-stack (although other orders are possible) which contains operand E. The flag 158 associated with operand E is examined to determine whether the entry contains valid data. In the example of FIG. 6, operand E's flag 158 indicates that operand E is valid. The JSM 102 then copies or moves operand E to the top of the main stack identified by pointer 164. Both pointers preferably may be decremented, with the micro-stack pointer 162 being decremented in a cyclical manner. In some embodiments, the pointers 162 and 164 may be saved so as not to lose the current state of the pointers. After synchronizing the main stack 160 to the micro-stack 146, the pointer values may be restored, if desired. After decrementing the micro-stack pointer 162, the pointer 162 then points to the entry containing operand D. Operand D's flag 158 is checked and the JSM determines that operand D is valid. Operand D then is copied or moved to the location pointed to by main stack pointer 164. This process repeats until a micro-stack entry is encountered whose flag 158 indicates that the entry does not contain valid data. In the example of FIG. 6, all micro-stack entries contain valid data, but in other cases, one or more entries may not contain valid data.

As each valid data value is copied from the micro-stack 146 to the main stack, the corresponding flag 158 is changed to indicate that the entry no longer contains valid data. Alternatively, once all valid data values from the micro-stack are copied to the main stack, the JSM may change all flags 158 to the invalid state.

Once the clean and invalidate instruction completes, the main stack 160 contains a complete view of all valid stack data. Further processing on one or more stack values may occur as desired. The state of the micro-stack 146 at this point is that the micro-stack does not contain any valid data.

As noted above, the clean instruction copies valid data from the micro-stack 146 to the main stack. The copying process preferably functions as described above with regard to the clean and invalidate instruction. Unlike the clean and invalidate instruction, for the clean instruction the JSM 102 does not change the flags 158 to invalidate any of the micro-stack entries. The clean instruction advantageously makes the main stack 160 coherent in the external memory, but still keeps the top values locally in the micro-stack 146, and marked as valid, for later use.

Figure 7:
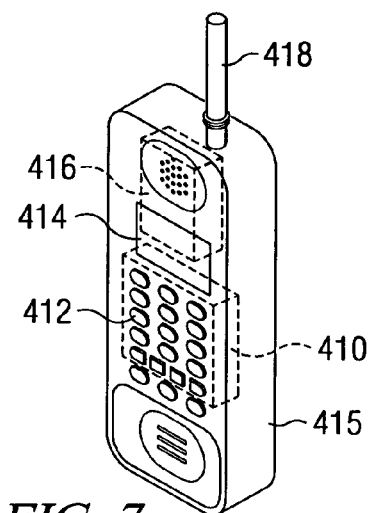
FIG. 7 depicts an exemplary embodiment of the system described herein.

As noted previously, system 100 may be implemented as a mobile cell phone such as that shown in FIG. 7. As shown, a mobile communication device includes an integrated keypad 412 and display 414. The JSM 102 and MPU 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system, comprising:
a main stack having a plurality of entries and residing outside of a processor's core, each of the main stack's entries configurable to contain data;
a local data stack coupled to the main stack and located internal to the processor's core, the local data stack having a plurality of entries that correspond to entries in the main stack, and each local data stack entry is configured to contain data; and
a plurality of flags, wherein each flag is associated with a corresponding entry in the local data stack and indicating whether the data in the corresponding local data stack entry is valid;
wherein the system performs an instruction that copies all valid data from the local data stack in the processor's core to corresponding entries in the main stack outside the processor's core.

2. The system of claim 1 wherein said system examines the flag associated with a local data stack entry to determine whether the entry contains valid data and, only if the entry contains valid data does the system copy the data from the entry to a corresponding entry in the main stack.

3. The system of claim 1 further including a local data stack pointer associated with the local data stack and a main stack pointer associated with the main stack, wherein the instruction causes the system to examine the flag associated with the entry identified by the local data stack pointer to determine whether that entry contains valid data, and if the entry contains valid data, the instruction causes the system to copy the entry's data to the entry in the main stack identified by the main stack pointer.

4. The system of claim 3 wherein the local data stack pointer is repeatedly decremented to permit the flags associated with additional entries in the local data stack to be examined for valid data, the data contained in each entry whose flag indicates that the data is valid is copied to the main stack at an entry pointed to by the main stack pointer with the main stack pointer also being decremented.

5. The system of claim 1 wherein the instruction causes the system to change a flag associated with valid data that is copied to the main stack to a state to indicate that the entry does not contain valid data.

6. The system of claim 1 wherein the instruction retains all previously valid data in the local data stack and marked as valid through the corresponding flags.

7. A method of cleaning a local data stack residing in a processor core, comprising:
  (a) examining a flag associated with each entry in the local data stack, the flag indicating whether the associated entry contains valid data;
  (b) if the flag for a particular entry indicates the presence of valid data, copying the data for that entry to a corresponding entry in a main stack that resides outside the processor core,
  (c) repeating (b) for all entries in the local data stack until all valid data from the local data stack has been copied to the main stack thereby cleaning the local data stack.

8. The method of claim 7 further comprising changing the flag for each entry containing valid data to indicate that the associated entry does not contain valid data.

9. The method of claim 7 further comprising not changing the flag for each entry containing valid data to indicate that the associated entry does not contain valid data.

10. The method of claim 7 wherein copying the data comprises copying data from a local data stack entry identified by a local data stack pointer to a corresponding entry in the main stack identified by a main stack pointer.

11. A system, comprising:
  a main stack having a plurality of entries and residing outside of a processor's core, each of the main stack's entries configurable to contain data;
  a local data stack coupled to the main stack and located internal to the processor's core, the local data stack having a plurality of entries each of which correspond to an entry in the main stack, and each local data stack entry is configured to contain data; and
  wherein the system executes an instruction that causes all valid data from the local data stack to be saved to the main stack.

12. The system of claim 11 wherein the instruction also causes entries in the local data stack to be designated for use to store new data.

13. The system of claim 11 wherein the instruction results in the entries in the local data stack containing valid data continuing to be designated as valid to cause said valid data to be retained in the local data stack.

* * * * *